US008518842B2

(12) United States Patent
Schreder et al.

(10) Patent No.: US 8,518,842 B2
(45) Date of Patent: Aug. 27, 2013

(54) TRANSPARENT LAS GLASS CERAMICS PRODUCED WITH ALTERNATIVE ENVIRONMENTALLY ACCEPTABLE FINING AGENTS

(75) Inventors: Bianca Schreder, Sulzbach (DE); Maria-Louisa Reich, Frankfurt am Main (DE); Olaf Claussen, Undenheim (DE)

(73) Assignee: Schott AG, Mainz (DE)

( * ) Notice: Subject to any disclaimer, the term of this patent is extended or adjusted under 35 U.S.C. 154(b) by 25 days.

(21) Appl. No.: 13/030,345

(22) Filed: Feb. 18, 2011

(65) Prior Publication Data

US 2011/0207591 A1 Aug. 25, 2011

(30) Foreign Application Priority Data

Feb. 22, 2010 (DE) .......................... 10 2010 002 188

(51) Int. Cl.
*C03C 10/14* (2006.01)
*C03C 10/12* (2006.01)

(52) U.S. Cl.
USPC .................................................. 501/4; 501/7

(58) Field of Classification Search
USPC ....................................................... 501/4, 7
See application file for complete search history.

(56) References Cited

U.S. PATENT DOCUMENTS

| 4,851,372 | A | 7/1989 | Lindig et al. |
| 6,698,244 | B1 | 3/2004 | Romer et al. |
| 6,930,289 | B2 | 8/2005 | Siebers et al. |
| 7,456,121 | B2 * | 11/2008 | Comte ............................. 501/4 |
| 7,465,686 | B2 * | 12/2008 | Comte ............................. 501/4 |
| 8,114,795 | B2 * | 2/2012 | Yagi et al. ......................... 501/5 |
| 2007/0129231 | A1 | 6/2007 | Comte |
| 2007/0281849 | A1 | 12/2007 | Yagi et al. |
| 2008/0026927 | A1 | 1/2008 | Monique Comte |
| 2008/0269038 | A1 * | 10/2008 | Schneider et al. .............. 501/63 |
| 2009/0162608 | A1 * | 6/2009 | Yagi et al. ..................... 428/141 |
| 2010/0224619 | A1 | 9/2010 | Schoenberger et al. |
| 2011/0136651 | A1 * | 6/2011 | Yagi et al. ........................ 501/7 |

FOREIGN PATENT DOCUMENTS

| DE | 1 596 860 | 9/1970 |
| DE | 199 39 771 | 2/2001 |
| DE | 199 39 787 | 2/2001 |
| EP | 1 864 952 | 12/2007 |
| EP | 2 226 303 | 9/2010 |
| JP | 11100229 | * 4/1999 |
| JP | 11100230 | * 4/1999 |
| JP | 11100231 | * 4/1999 |
| JP | 2002154840 | * 5/2002 |

OTHER PUBLICATIONS

"Glastechnische Fabrikationsfehler" Edited by H. Jebsen-Marwedel and R. Brueckner, Third Edition, 1980, Springer Verlag, on pp. 195 FF.

* cited by examiner

*Primary Examiner* — Karl Group
(74) *Attorney, Agent, or Firm* — Michael J. Striker

(57) ABSTRACT

The transparent glass ceramic with low thermal expansion is produced from a glass that is fined with a combination of environmentally friendly fining agents, specifically a combination of $SnO_2$ with at least one of $Sb_2O_3$, $SO_4^{2-}$, $Br^-$ and $Cl^-$. The glass is free of arsenic and is preferably made from a mixture of $SiO_2$, $Al_2O_3$, $Li_2O$, $TiO_2$, $ZrO_2$ and ZnO. A mirror support for astronomy and a prism for LCD lithography are advantageously made from this glass ceramic.

16 Claims, No Drawings

TRANSPARENT LAS GLASS CERAMICS PRODUCED WITH ALTERNATIVE ENVIRONMENTALLY ACCEPTABLE FINING AGENTS

CROSS-REFERENCE

The invention described and claimed herein below is also described in German Patent Application DE 10 2010 002 188.1, filed on Feb. 22, 2010 in Germany. The aforesaid German Patent Application, whose subject matter is incorporated herein by explicit reference thereto, provides the basis for a claim of priority of invention for the invention claimed herein below under 35 U.S.C. 119 (a)-(d).

BACKGROUND OF THE INVENTION

1. The Field of the Invention

The present invention relates to transparent glass ceramics having low thermal expansion, also called "zero expansion", containing only environmentally acceptable fining agents, or being fined only with environmentally acceptable fining agents, respectively, as well as to the uses of the glass ceramics according to the present invention.

2. The Related Art

Among glass ceramics having low thermal expansion, lithium-aluminium-silicon oxide glass ceramics, which are also known in the art as LAS glass ceramics, are so-called "zero expansion materials". A well-known type of this sort of glass ceramic material, known as ZERODUR®, is commercially available in three different thermal expansion classes of 0 to 2 and has different coefficients of linear thermal expansion a in a temperature range of 0° to 50° C. as shown in Table I herein below.

TABLE I

Linear Thermal Expansion Coefficients of Different Classes

| Expansion class | Coefficients of linear thermal expansion $\alpha$ |
|---|---|
| 0 | $0 \pm 0.02 \cdot 10^{-6}/K$ |
| 1 | $0 \pm 0.05 \cdot 10^{-6}/K$ |
| 2 | $0 \pm 0.10 \cdot 10^{-6}/K$ |

With respect to melting of glass the term "fining" means the removal of gas bubbles from the melt. To achieve the highest quality in terms of removal of foreign gas and bubbles a thorough mixing and degasifying of the molten mixture is necessary. The behavior of gases and bubbles, respectively, in the glass melt as well as their removal are described for example in "Glastechnische Fabrikationsfehler", edited by H. Jebsen-Marwedel and R. Brückner, third edition, 1980, Springer Verlag, on pages 195 ff.

Chemical fining methods are most often used. Their principle of operation is that compounds which undergo decomposition and release gases, compounds which are volatile at elevated temperatures or compounds which release gases in an equilibrium reaction at higher temperatures are added to the melt.

Sodium sulfate, for example, which is used for fining soda-lime glass, belongs to a first group of these compounds used for chemical fining. In this case, the release of $SO_2$ and $O_2$ takes place in a temperature range of 1300° C. to 1450° C. with a maximum at 1380° C. This temperature range approximately corresponds to the fining range of such glasses.

Compounds, which are volatile at high temperatures due to their vapor pressure and thus act as a gas, such as halides, sodium chloride or different fluorides, belong to a second group. Thus for example a series of boron silicate glasses are fined with sodium chloride. The fining agents of this second group are designated "volatilization fining agents".

A last group of fining agents comprises the so-called redox fining agents, such as arsenic oxide and antimony oxide. In practice, they are used most often. In the respective fining methods covalent ions, which can be present in at least two inter-related oxidation states in a temperature-dependent equilibrium with each other so that a gas, usually oxygen, is released at high temperatures, are used as redox fining agents.

For arsenic oxide as an example, the redox equilibrium that occurs in the melt can be represented by the following equation (I):

$$As_2O_5 \leftrightarrow As_2O_3 + O_2 \uparrow \quad \text{(I)},$$

The equilibrium constant K for equation (I) is given by equation (II):

$$K(T) = \frac{aAs_2O_3 \cdot z(O_2)}{aAs_2O_5}. \quad \text{(II)}$$

In this equation $aAs_2O_3$ and $aAs_2O_5$ represent the respective activities of the arsenic trioxide and arsenic pentoxide and $z(O_2)$ represent the fugacity (of the oxygen). The equilibrium constant K strongly depends on the temperature and a defined oxygen fugacity $z(O_2)$ can be adjusted with the temperature and the activity of the oxidic arsenic compounds.

A disadvantage of many redox fining agents is that they are harmful to the environment; at least they are not environmentally acceptable. Particularly this applies to arsenic oxide. However this particular fining agent has a property which is useful: The release of the fining gas $O_2$ has two maxima at about 1250° C. and at about 1600° C. These maxima correspond to the temperature range of melting, on the one hand, and the temperature range of fining, on the other hand. This sort of fining behavior is desirable, but arsenic trioxide is strongly toxic and undoubtedly classified as carcinogenic. Anionic arsenic is already present as arsenite and arsenate in high concentrations in the ground water of many countries. This is the reason that $As_2O_3$ is to be forbidden in several countries in the next years.

DE 1 596 860 discloses a method for the production of transparent glass ceramics having low thermal expansion. As a fining agent 0.3 to 0.5% by weight of $As_2O_3$ is used. Environmentally acceptable fining agents are not discussed.

U.S. Pat. No. 4,851,372 describes transparent glass ceramics which are fined with 0 to 1.5% by weight of $As_2O_3$ or $Sb_2O_3$. Also in this case, there is no discussion about environmentally acceptable fining agents.

EP 1 864 952 A1 describes aluminium silicate and lithium aluminium silicate glass ceramics containing amounts of $SnO_2$ and/or $CeO_2$ of 0.01 to 5.0 percent by mass each, based on the oxides. However, the cerium oxide affects the transmissions of the glass ceramics.

US 2007/0281849 A1 describes glass ceramics containing amounts of $SnO_2$ and/or $CeO_2$ of 0.01 to 5.0 percent by mass, based on the oxides. The presence of cerium oxide is a disadvantage, because it may result in an undesired coloration.

DE 199 39 771 A1 describes a fining method for glass melts during which a fining gas is produced in the glass melt by a fining agent. As fining agents redox compounds, in particular redox oxides such as $SnO_2$, $CeO_2$, $Fe_2O_3$, $ZnO$, $TiO_2$, $V_2O_5$, $MoO_3$, $WO_3$, $Bi_2O_5$, $PrO_2$, $Sm_2O_3$, $Sb_2O_5$, $Eu_2O_3$, $TbO_2$ and/or $Yb_2O_3$, can be used. In addition, metal oxides, such as ZnO, $As_2O_3$, $Sb_2O_3$, $Bi_2O_3$ and/or SnO, are added, which release oxygen and change into the metallic state, during the fining operation. Many of these fining agents and their combinations, such as $CeO_2$ and $Fe_2O_3$, change the transmission properties of the glass ceramic in a disadvantageous manner.

SUMMARY OF THE INVENTION

It is the object of the present invention to provide transparent glass ceramics having low thermal expansion which contain alternative environmentally acceptable fining agents and preferably avoid the disadvantages of the above-described environmentally unacceptable fining agents.

The object of the present invention is attained by the subject matter of the patent claims appended herein below.

The object is in particularly attained by a transparent glass ceramic having a low thermal expansion, comprising the following composition, % by weight, based on oxide content:

| | |
|---|---|
| $SiO_2$ | 35 to 70 |
| $Al_2O_3$ | 17 to 35 |
| $Li_2O$ | 2 to 6 |
| $TiO_2$ | 0 to 6 |
| $ZrO_2$ | 0 to 6 |
| $TiO_2 + ZrO_2$ | 0.5 to 9 |
| ZnO | 0.5 to 5, | wherein the glass ceramic is produced by fining with $SnO_2$ and at least one further fining agent.

The method of producing these glass ceramics comprises adding to a crystallizable glass a mixture of fining agents that permits production of a glass ceramic having low thermal expansion without using arsenic oxide. Preferred mixtures of fining agents are mixtures of $SnO_2$ with the further fining agents $Sb_2O_3$, $SO_4^{2-}$, $Br^-$ and/or $Cl^-$. In order to obtain glass ceramics with good transparencies, the fining agents should be used in the correct proportions, i.e. in a preferred molar ratio of $SnO_2$ to further fining agents of 1:2 to 2:1.

The respective fining method of the invention is a so-called mixed fining. In production the fining using $SnO_2$ as a fining agent results in a chemical equilibrium represented by the following equation (III):

$$2SnO_2 \leftrightarrow 2SnO + O_2 \quad (III),$$

Thus the glass ceramic according to the present invention comprises SnO, which has been formed from $SnO_2$, and at least one further component, which has been formed from a fining agent preferably selected from the group consisting of $Sb_2O_3$, $SO_4^{2-}$, $Br^-$ and $Cl^-$.

Preferably the respective components, which result from the fining agents $SnO_2$ and $Sb_2O_3$ or $SO_4^{2-}$ or $Br^-$ or $Cl^-$, are contained in the glass ceramic according to the present invention. When $SO_4^{2-}$, $Br^-$ or $Cl^-$ act as fining agents, they are added to the starting melt in the form of their alkali or alkaline earth salts.

According to the present invention combinations of fining agents are provided which can provide similar fining conditions as $As_2O_3$ which has already been described above as an environmentally unacceptable fining agent due to its toxic and carcinogenic properties. In this case, the fining agents satisfy the further condition that no significant changes in a proven and tested melting process are necessary. A nearly similar fining effect can be achieved in comparison to the fining agent arsenic trioxide without the need for a change in process parameters. This significantly reduces costs and thus allows an economically advantageous production of the ceramics according to the present invention.

$Sb_2O_3$ as a fining agent has a high $O_2$ release peak at about 1150° C. which overlaps the $O_2$ release peak of $As_2O_3$ at 1250° C. The sulfate releases $SO_2$ and $O_2$ at about 1300° C. Thus, the combination of both fining agents is suitable for replacing the toxic $As_2O_3$. $Br^-$ and $Cl^-$ are released as HX (X=Cl, Br) already at lower temperatures. This results in the release of less fining gas than $Sb_2O_3$ or sulfate at higher temperatures (>1200° C.) in the case of these latter fining agents. Therefore these latter fining agents are used in a supportive manner.

In the selection of suitable combinations of fining agents the fact that none of the fining agents used should cause coloration of the glass ceramic product must be considered. Therefore these glass ceramics are preferably not fined with $CeO_2$ so that the glass ceramics are essentially free of $CeO_2$.

According to the present invention the glass ceramic contains at least one component, which has been formed from a fining agent, in an amount of 0.001 to 2% by mol each, based on the total amount of glass ceramic present.

When it is said that the glass ceramics are "free of", "do not contain", or are "essentially free of" a certain component or a certain component is not used in the preparation of the glass ceramic, this means that the respective component can only be present as an impurity in very small amounts. These very small amounts are typically below 100 ppm, preferably below 50 ppm.

Preferably the present glass ceramics are free of iron oxides because iron can affect the transmissions of the glass ceramics of the present invention. The glass ceramics are also preferably free of vanadium oxides.

The glass ceramic according to the present invention preferably contains a component resulting from a fining agent in an amount of 0.001 to 2% by mol.

The glass ceramic according to the present invention preferably contains a component resulting from the fining agent $SnO_2$, in particular SnO, in a proportion of 0.001 to 2% by mol.

In the present invention the term "zero expansion materials" means glass ceramics with a coefficient of linear thermal expansion that is zero or near zero in a defined temperature range.

The glass ceramics according to the present invention have a thermal expansion of expansion class 2, preferably of expansion class 1, and more preferably of expansion class 0. A special material, ZERODUR®K20, which for example is produced from ZERODUR® by a further step of additional ceramization has a coefficient of linear thermal expansion, or expansion of length, of 1.5 ppm/K.

The glass ceramic according to the present invention preferably comprises one or more of the following further components, in % by weight, based on oxide content:

| | |
|---|---|
| $B_2O_3$ | 0 to 6 |
| $Na_2O$ | 0 to 2 |
| $K_2O$ | 0 to 2 |
| MgO | 0 to 5 |
| $P_2O_5$ | 0 to 17 |
| CaO | 0 to 4 |
| BaO | 0 to 5 |
| SrO | 0 to 5. |

Preferably the glass ceramic according to the present invention does not contain $As_2O_3$, $CeO_2$ and/or PbO. $As_2O_3$ and PbO are toxic and are a heavy burden for the environment. $CeO_2$ results in a very strong self-coloring of the glass ceramic which is not desirable for the glass ceramics according to the present invention. This change in color may possibly be further intensified by formation of a colored complex of $TiO_2$—$CeO_2$.

A further reason not to use of $CeO_2$ is that in the production process of the glass ceramic oxygen is released already between 950° C. and 1050° C. $CeO_2$ has a release peak at about 1000° C. which is too low for replacing As (first release peak at 1250° C.). But the fining temperature should be 1250° C. so that it is in accordance with the temperature of the first release peak of $As_2O_3$ for a good fining effect. It would be very expensive and disadvantageous for the high homogeneity and reproducibility provided so far to change the melting process so that it can be adjusted to the earlier release of oxygen in the fining process using $CeO_2$. Only in this way a fining effect can be obtained which is as good as the one which is achieved by the use of the fining agent $As_2O_3$. However this possibility does not result in an economic alternative.

Glass ceramics comprising one or more crystal phases selected from the group consisting of high quartz, mixed high quartz crystal, keatite, mixed keatite crystal and β-eucryptite are preferable in the glass ceramics according to the present invention.

Preferably the glass ceramics according to the present invention only contain small amounts of the residual gases $CO_2$, $SO_2$, $O_2$, argon or $N_2$ or combinations thereof. The content of the residual gas, for example in ZERODUR®, which has been produced by the use of toxic $As_2O_3$ or by the use of fining combinations according to the present invention, such as $SnO_2/SO_2$ or $SnO_2/Sb_2O_3$, is listed in table II. From the values in table II it becomes clear that the content of residual gas in the glass ceramic with the fining combinations according to the present invention is the same or even significantly lower than the respective content resulting from the use of the fining agent $As_2O_3$.

TABLE II

Content of Residual Gas in Zerodur ® for Different Fining Agents

| Glass | $CO_2$/ppm | $SO_2$/ppm | $O_2$/ppm | Ar/ppm qualitative | $N_2$/ppm qualitative |
|---|---|---|---|---|---|
| Production-ZERODUR ®-$As_2O_3$ | 9.3 ± 0.9 | 0.8 ± 0.2 | 204 ± 19 | <0.1 | 1.7 |
| Laboratory-ZERODUR ®-$As_2O_3$ | 10.2 ± 1.5 | <0.5 | 228 ± 39 | 0.3 | 1 |
| Laboratory-ZERODUR ®-$SnO_2/SO_2$ | 4.5 ± 1.5 | 1.2 ± 0.2 | 225 ± 20 | <0.1 | 0.6 |
| Laboratory-ZERODUR ®-$SnO_2/Sb_2O_3$ | 7.6 ± 0.9 | <0.5 | 204 ± 20 | 0.3 | 0.3 |

Preferably the glass ceramic according to the present invention is used in lithography, astronomy or as a precision element. In lithography the glass ceramic is preferably used in LCD lithography and in microlithography. Further preferably, the glass ceramic according to the present invention is used in EUV lithography.

The use of a combination of $SnO_2$ together with a further fining agent for fining of glasses, which are suitable for the production of glass ceramics, is also an aspect of this invention. These glass ceramics are those described herein. A method of producing a glass ceramic according to this invention with the process steps described in this description is also an aspect of this invention.

Mirror supports used in astronomy preferably comprise a glass ceramic according to the present invention. In addition mirror supports for LCD lithography and EUV lithography also preferably comprise a glass ceramic according to the present invention. Preferably, the mirror support is a lightweight mirror support. Prisms used in LCD lithography preferably comprise a glass ceramic according to the present invention. These mirror supports and prisms are also an important aspect of the present invention.

While the invention has been illustrated and described as embodied in transparent LAS glass ceramics produced with alternative environmentally acceptable fining agents and uses thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed is new and is set forth in the following appended claims.

We claim:

1. A transparent glass ceramic having low thermal expansion and a composition, in % by weight, based on oxide content, of:

| | |
|---|---|
| $SiO_2$ | 35 to 70 |
| $Al_2O_3$ | 17 to 35 |
| $Li_2O$ | 2 to 6 |
| $TiO_2$ | 0 to 6 |
| $ZrO_2$ | 0 to 6 |
| $TiO_2 + ZrO_2$ | 0.5 to 9 |
| ZnO | 0.5 to 5, | wherein the glass ceramic is produced by fining with $SnO_2$ and at least one further fining agent selected from the group consisting of $Sb_2O_3$, $SO_4^{2-}$, $Br^-$ and $Cl^-$;
wherein a molar ratio of the $SnO_2$ to the at least one further fining agent is from 1:2 to 2:1,
wherein the transparent glass ceramic has a thermal expansion coefficient in a range of $-0.10 \cdot 10^{-6}$/K to $+0.10 \cdot 10^{-6}$/K in a temperature range of 0° C. to 50° C., and
wherein the glass ceramic contains one or more crystal phases selected from the group consisting of high quartz, mixed high quartz crystal, keatite, mixed keatite crystal and β-eucryptite.

2. The glass ceramic according to claim 1, further comprising at least one additional component formed from a fining ingredient selected from the group consisting of $Sb_2O_3$, $SO_4^{2-}$ and $Cl^-$.

3. The glass ceramic according to claim 2, wherein said at least one additional component formed from the fining ingredient is contained in an amount of 0.001 to 2% by mol each, based on a total amount of the glass ceramic.

4. The glass ceramic according to claim 1, further comprising a component formed from said $SnO_2$ in an amount of 0.001 to 2% by mol.

5. The glass ceramic according to claim 1, wherein said thermal expansion coefficient is from $-0.05 \cdot 10^{-6}$/K. to $+0.05 \cdot 10^{-6}$/K in said temperature range of 0° C. to 50° C.

6. The glass ceramic according to claim 1, additionally comprising one or more of the following components, in % by weight, based on oxide content:

| | |
|---|---|
| $B_2O_3$ | 0 to 6 |
| $Na_2O$ | 0 to 2 |
| $K_2O$ | 0 to 2 |
| MgO | 0 to 5 |
| $P_2O_3$ | 0 to 17 |
| CaO | 0 to 4 |
| BaO | 0 to 5 |
| SrO | 0 to 5. |

7. The glass ceramic according to claim 1, which is free of $As_2O_3$, $CeO_2$ and/or PbO.

8. An element for lithography, in particular for LCD lithography and microlithography, in astronomy or as a precision element, said element comprising a glass ceramic according to claim 1.

9. A method of fining glass to be used for producing a transparent glass ceramic, wherein said transparent glass ceramic has a low thermal expansion and a composition, in % by weight, based on oxide content of:

| | |
|---|---|
| $SiO_2$ | 35 to 70 |
| $Al_2O_3$ | 17 to 35 |
| $Li_2O$ | 2 to 6 |
| $TiO_2$ | 0 to 6 |
| $ZrO_2$ | 0 to 6 |
| $TiO_2 + ZrO_2$ | 0.5 to 9 |
| ZnO | 0.5 to 5, | wherein the glass ceramic is produced by fining with $SnO_2$ and at least one further fining agent selected from the group consisting of $Sb_2O_3$, $SO_4^{2-}$ and $Cl^-$;
wherein a molar ratio of the $SnO_2$ to the at least one further fining agent is from 1:2 to 2:1,
wherein the transparent glass ceramic has a thermal expansion coefficient in a range of $-0.10 \cdot 10^{-6}$/K to $+0.10 \cdot 10^{-6}$/K in a temperature range of 0° C. to 50° C., and
wherein the glass ceramic contains one or more crystal phases selected from the group consisting of high quartz, mixed high quartz crystal, keatite, mixed keatite crystal and β-eucryptite, and wherein said method comprises fining with $SnO_2$ and at least one further fining agent selected from the group consisting of $Sb_2O_3$, $SO_4^{2-}$ and $Cl^-$ in a molar ratio of 1:2 to 2:1.

10. A mirror support for astronomy, said mirror support comprising a glass ceramic according to claim 1.

11. The mirror support according to claim 10, which is light-weight.

12. A prism for LCD lithography, said prism comprising a glass ceramic according to claim 1.

13. A mirror support for LCD lithography, said mirror support comprising a glass ceramic according to claim 1.

14. A method of producing a glass ceramic according to claim 1, said method comprising the step of fining a glass melt with a combination of fining agents comprising $SnO_2$ and at least one further fining agent selected from the group consisting of $Sb_2O_3$, $SO_4^{2-}$, $Br^-$ and $Cl^-$.

15. The glass ceramic according to claim 1, which is free of vanadium oxides.

16. The glass ceramic according to claim 1, containing less residual gas than a glass ceramic of the same composition, except that the $SnO_2$ and the at least one further refining agent are replaced by $As_2O_3$.

* * * * *